July 31, 1951 W. H. T. HOLDEN 2,562,717

DIALED NUMBER RECOVERY CIRCUIT

Filed Aug. 22, 1947 4 Sheets-Sheet 1

INVENTOR
W. H. T. HOLDEN
BY R. Marino
ATTORNEY

July 31, 1951 W. H. T. HOLDEN 2,562,717

DIALED NUMBER RECOVERY CIRCUIT

Filed Aug. 22, 1947 4 Sheets-Sheet 2

INVENTOR
W. H. T. HOLDEN
BY R. Mariano
ATTORNEY

July 31, 1951 W. H. T. HOLDEN 2,562,717
DIALED NUMBER RECOVERY CIRCUIT
Filed Aug. 22, 1947 4 Sheets-Sheet 3

INVENTOR
W. H. T. HOLDEN
BY R. Marino
ATTORNEY

INVENTOR
W. H. T. HOLDEN
BY R. Marino
ATTORNEY

Patented July 31, 1951 2,562,717

UNITED STATES PATENT OFFICE 2,562,717

DIALED NUMBER RECOVERY CIRCUIT

William H. T. Holden, Woodside, N. Y., assignor to Bell Telephone Laboratories, Incorporated, New York, N. Y., a corporation of New York Application August 22, 1947, Serial No. 770,131

15 Claims. (Cl. 179—18)

This invention relates to telephone systems and particularly to telephone systems in which impulse-operated switches are used to establish connections.

In systems of this type, some of the digits dialed by a calling subscriber are ordinarily not registered but are employed to actuate the switching means to connect the calling subscriber's line to a trunk. These digits are, therefore, "lost." In automatic message accounting systems it is necessary and for other purposes it may be desirable, to "recover" these lost digits in order to obtain a record or a registration of the office code dialed by the calling subscriber.

The present invention discloses a novel means for indicating, after a connection has been established, the digits dialed by the calling subscriber to establish the connection.

A feature of the invention is the employment of electronic devices for the recovery of the lost digits.

Another feature of the invention is the use of an extremely short impulse to actuate the electronic devices whereby the operation is effected in such a short time that it may be performed on several connections almost simultaneously.

These and other features of the invention will be more apparent from the accompanying description, the appended claims, and the drawings, in which:

Figures 1, 5:
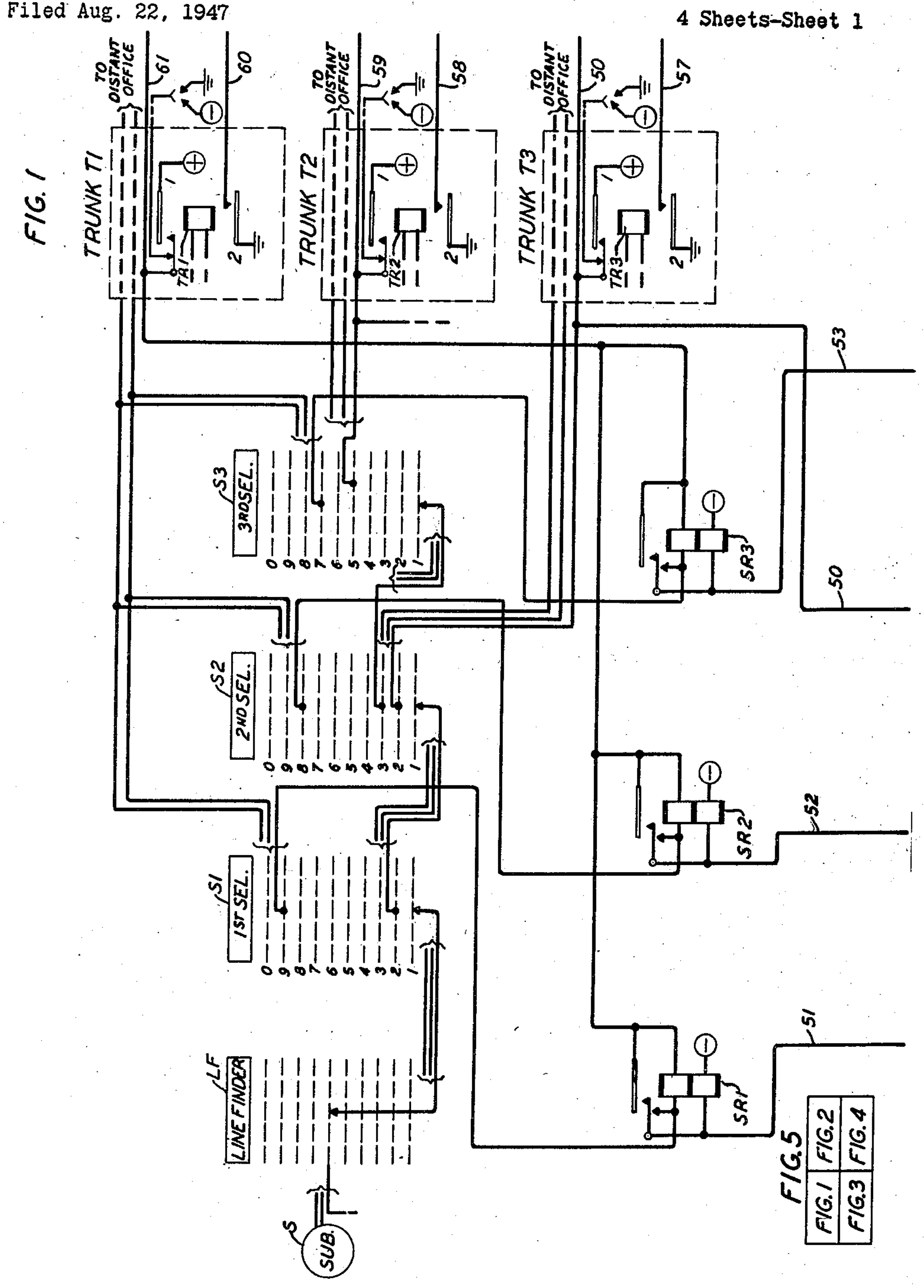
Fig. 1 shows a subscriber's station and switching means therefor.
Fig. 5 shows how the above figures should be placed in relation to one another to completely disclose the invention.
Figure 2:
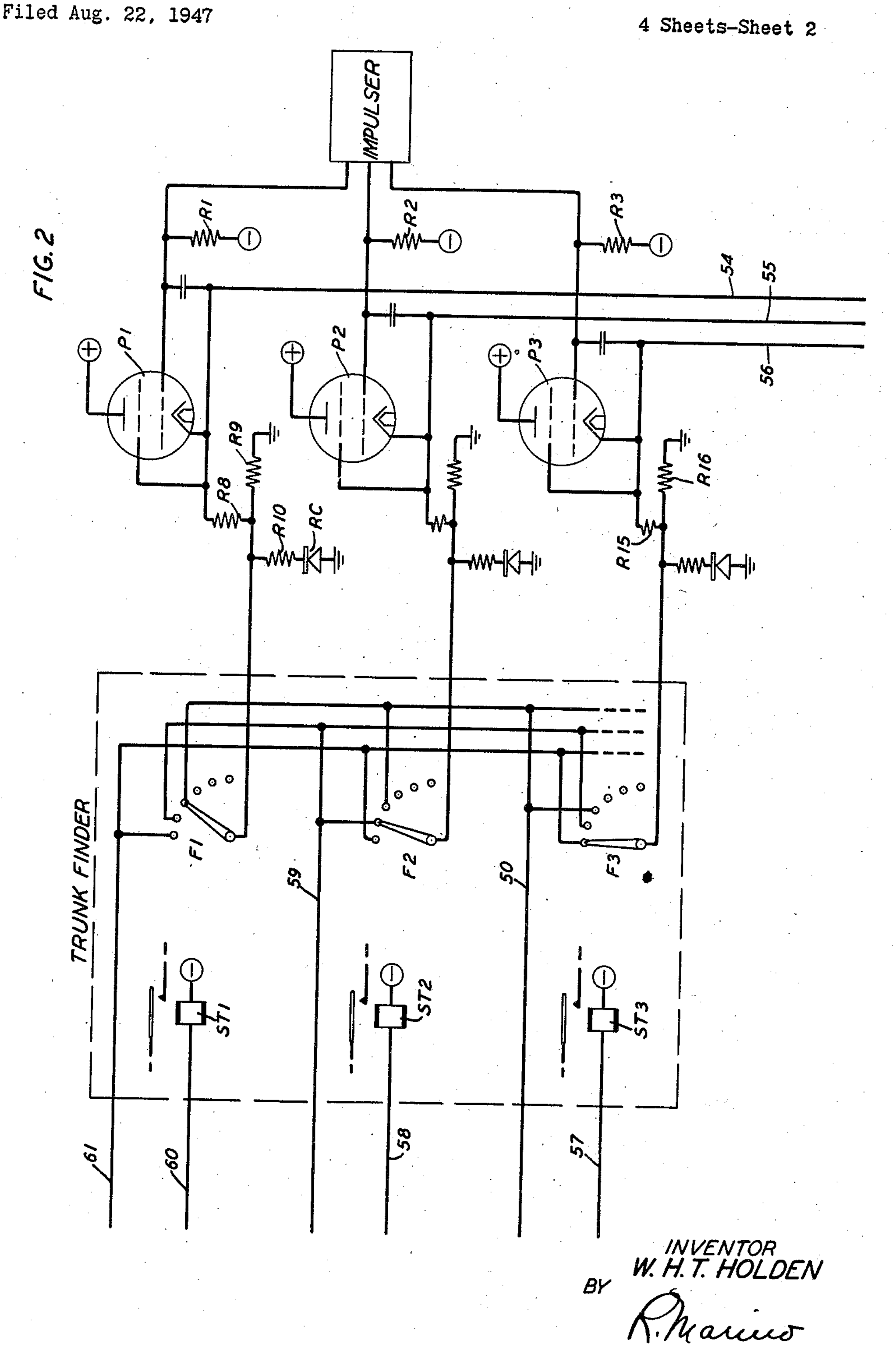
Fig. 2 shows trunk circuits, trunk-finder circuits, and impulse tubes; it also indicates impulsing means for actuating said tubes.

In Figs. 1 and 2, one subscriber's station, a line finder, a first selector, a second selector, a third selector, and three trunks are indicated. It will be understood that the invention is applied to a complete telephone system comprising many subscribers' stations, line finders, selectors, and trunks with the usual interconnections, and that the circuits shown are merely illustrative. They will, however, serve to show the construction and operation of the invention.

In systems of the kind to which the invention is applicable, connections may be made to trunks from first selectors by dialing one digit, from second selectors by dialing two digits, and from third selectors by dialing three digits. For example, trunk T1 may be reached from the ninth level of first selector S1 by dialing the digit "9," trunk T3 may be reached from the second level of second selector S2 by dialing the digits "22," and trunk T2 may be reached from the fifth level of third selector S3 by dialing the digits "235." In some cases, a trunk may be reached from all three selector stages. For example, trunk T1 may be reached not only from the ninth level of first selector S1 by dialing the digit "9," but also from the eighth level of second selector S2 by dialing the digits "28" and from the seventh level of third selector S3 by dialing the digits "237."

In accordance with the present invention, the sleeve conductor of each trunk which can be reached from one selector stage only is connected to one element of each of a plurality of diode gas tubes. For example, the sleeve conductor 50 of trunk T3 the terminals of which are located at selector S2 and which can be reached only by dialing two digits, as described above, is connected to one element of each of tubes N6, N7 and N8. The number of said tubes is, in each case, one more than the number of digits required to be dialed to reach the trunk. In the case of trunk T3, therefore, three tubes N6, N7 and N8 are provided since two digits are required to reach said trunk. In the case of trunk T2, to reach which three digits are required to be dialed since the trunk is accessible from the terminals of the third selector S3 only, four similar tubes (not shown) are provided. Where a trunk, such as trunk T1, may be reached over the terminals of more than one selector stage, the sleeve conductor of each appearance of said trunk at each of said stages is connected through the winding of a relay for the trunk individual to each appearance. For example, the sleeve conductor of the appearance of trunk T1 on selector S1 is connected to said trunk through the upper winding of relay SR1, the sleeve conductor of the appearance of trunk T1 on selector S2 is connected to said trunk through the upper winding of relay SR2, and the sleeve conductor of the appearance of trunk T1 on selector S3 is connected to said trunk through the upper winding of relay SR3. A contact and the lower winding of each of said relays are connected to one element of each of a plurality of diode gas tubes. For example, a contact and the lower winding of relay SR1 are connected by conductor 51 to one element of each of tubes N1 and N2, a contact and the lower winding of relay SR2 are connected by conductor 52 to one element of each of tubes N3, N4 and N5, and a contact and the lower winding of relay SR3 are connected by conductor 53 to one element of each of the tubes N9, N10, N11 and N12. The number of tubes in each group is one more than the number of digits required to be dialed to reach the associated trunk appearance. For example, the two tubes N1 and N2 are associated with the appearance of trunk T1 on selector S1, to reach which appearance one digit is dialed. Similarly, four tubes N9, N10, N11 and N12 are associated with the appearance of trunk T1 on selector S3, three digits being required to reach said appearance.

Figure 3:
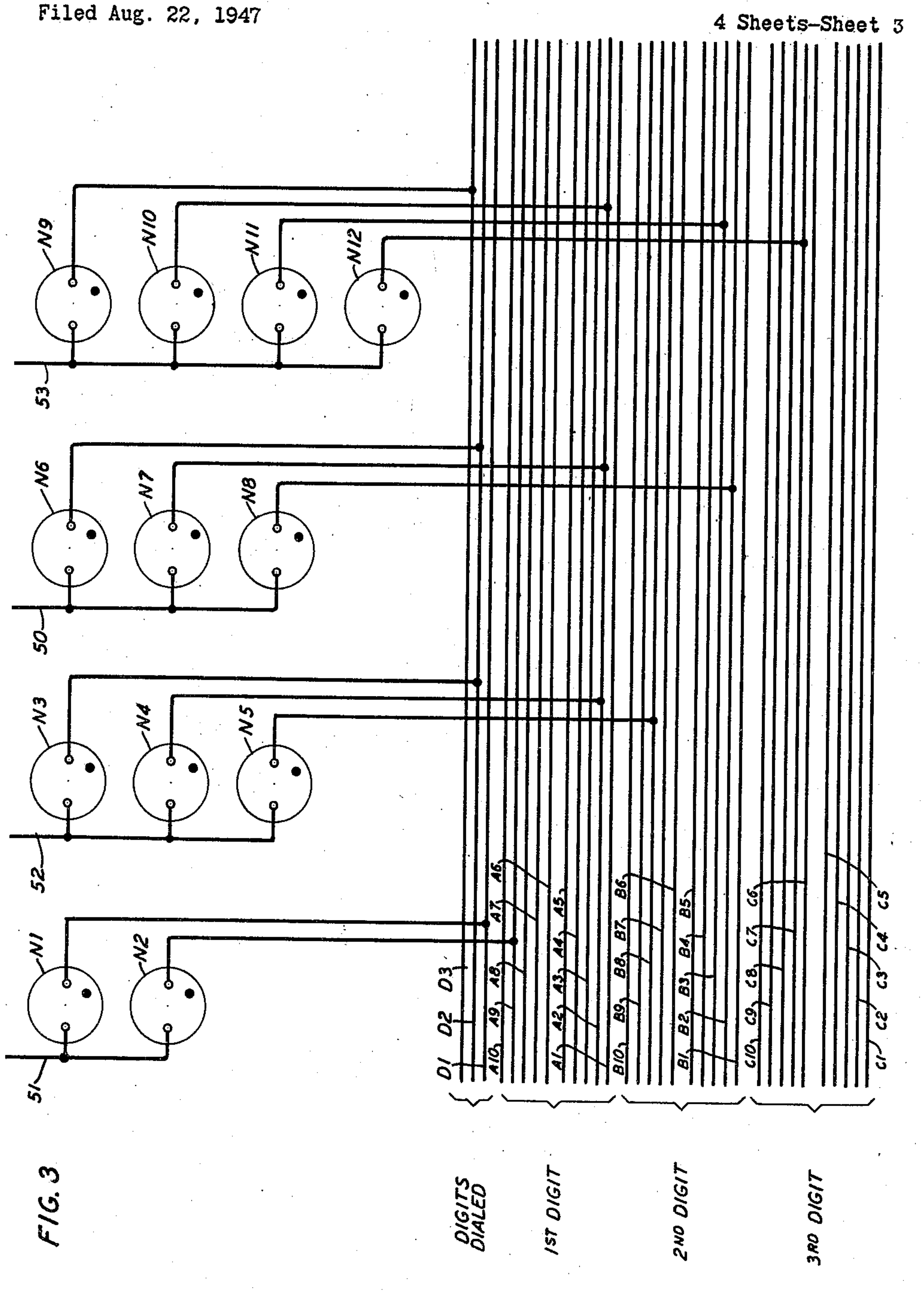
Fig. 3 shows tubes and bus bars associated with trunk circuits.

In each group of the aforesaid gas tubes, one tube (the upper in Fig. 3) is used to indicate the number of digits dialed by a calling subscriber in reaching the trunk. The other element, therefore, is connected to the corresponding one of the common conductors or bus bars D1, D2 and D3. For example, an element of tube N3, associated with a trunk appearance reached by dialing two digits, is connected to bus bar D2 to which is also connected an element of tube N6 likewise associated with a trunk appearance (that of trunk T3, for example, which is reached by dialing two digits) while an element of tube N1, associated with a trunk appearance reached by dialing one digit, is connected to bus bar D1 and an element of tube N9, associated with a trunk appearance reached by dialing three digits, is connected to bus bar D3.

The other tubes in each group are used to indicate the respective digits dialed by calling subscribers to reach trunks and an element of each is connected to a corresponding bus bar or path A1 . . . A10, B1 . . . B10, or C1 . . . C10. For example, to reach the appearance of trunk T1 on selector S2 or on selector S3, or to reach trunk T3, the first digit dialed is "2," while to reach the appearance of trunk T1 on selector S1, the first digit dialed by the calling subscriber is "9." One element of each of tubes N4, N7 and N10 is, therefore, connected to bus bar A2 and the corresponding element of tube N2 to bus bar A9. For the second digit dialed, one element of each of tubes N5, N8, and N11 is similarly connected to the appropriate bus bars B1 . . . B10, and for the third digit dialed an element of tube N12 is similarly connected to one of the bus bars C1 . . . C10. It will be understood that other trunks not shown are similarly provided with tubes which are similarly connected to the bus bars.

Figure 4:
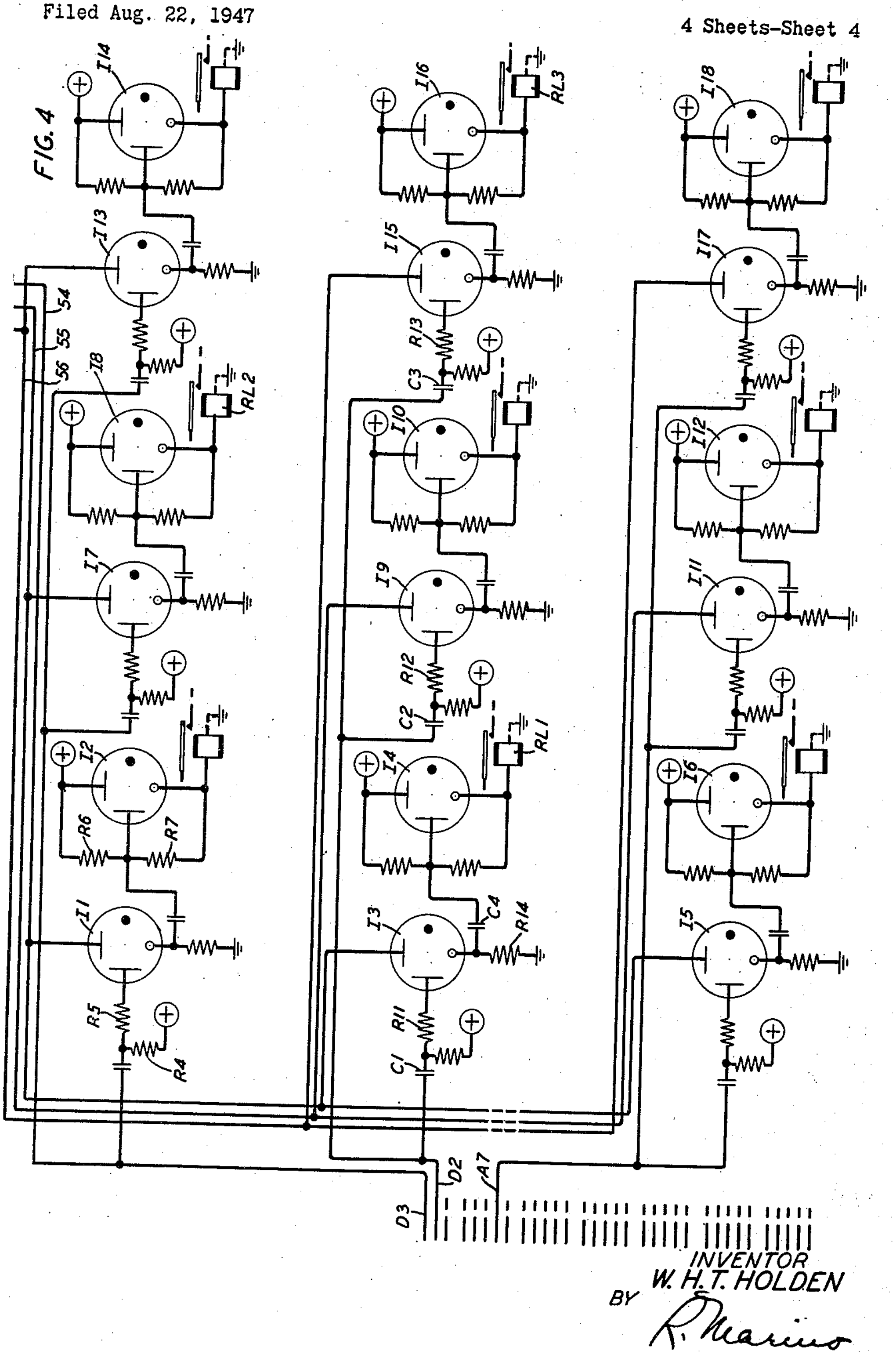
Fig. 4 shows indicating tubes and relays associated with the bus bars of Fig. 3.

With the bus bars A1 . . . D3 is associated one or more recovery circuits each comprising two triode gas indicating tubes for each bus bar and a pulsing tube. Three such circuits are indicated in Figs. 2 and 4. Tubes I1, I2, I3, I4, I5 and I6 are indicating tubes and tube P1 the pulsing tube of one recovery circuit, tubes I7, I8, I9, I10, I11, and I12 are indicating tubes and tube P2 the pulsing tube of a second recovery circuit, while tubes I13, I14, I15, I16, I17, and I18 are indicating tubes and tube P3 the pulsing tube of the third recovery circuit. While in each of these circuits, indicating tubes are shown associated with bus bars D2, D3 and A7 only, it will be understood that in each circuit, similar indicating tubes are provided for each bus bar. With each of the tubes I2, I4, I6, etc. is associated a relay, such as relay RL1 associated with tube I4, which, by its operation, indicates the digit to which said tube, tube I3, and bus bar D2 are assigned. Lamps or other suitable devices could be used as indicating means in place of said relays. Any number of recovery circuits, as required by the traffic, may be associated with the bus bars in the manner shown.

The anode of each of the pulsing tubes P1, P2 and P3 is supplied with positive potential but the control grid of each of said tubes is biased by negative battery through resistances R1, R2 and R3, respectively, so that said tubes conduct only if the potentials of their control grids are made less negative. An impulser, indicated in Fig. 2, is arranged to successively and repeatedly raise the potentials of the control grids of tubes P1, P2 and P3 so that said tubes successively and repeatedly conduct during short intervals. A suitable form of impulser for actuating tubes P1, P2 and P3 is disclosed in the application of J. W. Dehn et al. Serial No. 670,358, filed May 17, 1946, which issued as Patent No. 2,484,612 on October 11, 1949.

The cathode of each of the pulsing tubes P1, P2 and P3 is connected to the anodes of all of the first associated indicating tubes. Thus, the cathode of tube P1 is connected by conductor 54 to the anodes of the tubes I1, I3, I5, etc., the cathode of tube P2 is connected by conductor 55 to the anodes of the tubes I7, I9, I11, etc., and the cathode of tube P3 is connected by conductor 56 to the anodes of the tubes I13, I15, I17, etc. When, and only when, a pulsing tube conducts, positive potential is thereby supplied to the anodes of the associated indicating tubes. Since tubes P1, P2 and P3 do not conduct simultaneously, potential is not supplied to the anodes of the indicating tubes of more than one recovery circuit at one time. The starting element of each of said indicating tubes is biased by positive battery through resistances, such as resistances R4 and R5 for tube I1, but said bias is insufficient to initiate conduction in said tube. Conduction may, however, be initiated by slightly raising the potential of said starting element.

The anode of each of the second indicating tubes of each of the recovery circuits, such as tubes I2, I8, I14, etc., is supplied with positive potential and the starting element biased by positive potential from a voltage divider composed of resistances, such as resistances R6 and R7 for tube I2. The bias is insufficient to initiate conduction but conduction may be initiated by slightly raising the potential of said starting element.

A trunk finder, indicated in Fig. 2, which may be of any suitable well-known form, is provided for connecting the cathodes of the pulsing tubes P1, P2 and P3 to the sleeve conductors of trunks when required.

To illustrate the operation of the invention, it will be assumed that a call has been originated at station S and that, when the line of said station has been extended, in the usual way, by line finder LF, the digits "22" are dialed at said station, actuating selectors S1 and S2, in the well-known manner, to further extend the line of station S to trunk T3. When it is desired to recover the digits dialed by the subscriber at station S to extend his connection, as described above, relay TR3 in the circuit of trunk T3 is operated, by any suitable means which may be responsive to a signal over the tip and ring conductors of the trunk or to other means of control. Positive battery is thereby connected through No. 1 front contacts of relay TR3 and conductor 50 to tubes N6, N7 and N8 but said battery is insufficient to cause conduction in said tubes. A circuit is also completed from battery through the winding of the associated start relay ST3 of the trunk finder, conductor 57, and No. 2 contacts of relay TR3 to ground, operating said start relay which, in the well-known manner, actuates a finder switch, for example, switch F1, to connect the cathode of pulsing tube P1 through resistance R8 to the sleeve conductor 50 of trunk T3.

When, now, tube P1 momentarily conducts over a circuit extending from positive battery through the anode-cathode space of said tube and resistances R8 and R9 to ground, supplying, from its cathode, positive potential to the anodes of tubes I1, I3, I5, etc., a pulse of positive potential is also transmitted from the junction of resistances R8 and R9 through switch F1 and conductor 50 to tubes N6, N7 and N8, causing said tubes momentarily to conduct. Said positive pulse does not pass through resistance R10 and rectifier RC since said rectifier is poled to oppose passage of positive potential and to provide a path to ground for negative potential only. Said positive pulse is transmitted through tubes N6, N7, N8 to bus bars D2, A2 and B2. The positive pulse on bus bar D2 produces, from condenser C1, a corresponding pulse through resistance R11 to the starting element of tube I3, from condenser C2 through resistance R12 to the starting element of tube I9, and from condenser C3 through resistance R13 to the starting element of tube I15. The pulses produced by condensers C2 and C3 are ineffective since the anodes of tubes I9 and I15 are not supplied with potential. The pulse produced by condenser C1, however, causes tube I3 to conduct over a circuit extending from positive battery through the anode-cathode space of tube P1, conductor 54, the anode-cathode space of tube I3, and resistance R14 to ground. The potential of the cathode of tube I3 is thereby suddenly raised, producing, from condenser C4, a positive pulse to the starting element of tube I4, causing tube I4 to conduct over a circuit extending from positive battery through the anode-cathode space of said tube and the winding of relay RL1 to ground. Said relay is thereby operated and indicates that two digits were dialed at station S to reach trunk T3. Tube I3 ceases to conduct when tube P1 ceases to conduct, potential then being removed from the anode of tube I3, but tube I4 continues to conduct, holding relay RL1 operated, until released by any appropriate means.

In the same manner, the positive pulse transmitted to bus bars A2 and B2, as described above, affects two other sets of tubes (not shown) of the first recovery circuit similar to tubes I3 and I4 which, in turn, operate two relays (not shown) similar to relay RL1 and in the same manner. Operation of these two relays indicates that the digits dialed at stations S to extend the line of said station were "22."

If, during the operations described above, another call is made by another station (not shown) to trunk T2, and relay TR2 is operated to recover the digits dialed at said station, the circuit of the start relay ST2 is closed from battery through the winding of said relay, conductor 58, and No. 2 contacts of relay TR2 to ground, operating said start relay, which causes one of the trunk finder switches, for example, switch F2 to connect the cathode of pulsing tube P2 to the sleeve conductor 59 of trunk T2. When tube P2 conducts, positive pulses are transmitted, in the manner described above, through four tubes (not shown), similar to tube N6, to bus bars D3, A2, B3 and C5. Since the pulsing tubes P1, P2 and P3 do not conduct simultaneously, said positive pulse on bus bar D3 is ineffective as regards tubes I1 and I13 but is effective in respect to tube I7, which then affects tube I8, in the manner described above, to operate relay RL2. Operation of said relay indicates that three digits were dialed to reach trunk T2. In the same way, the positive pulses on bus bars A2, B3 and C5 affect other tubes and relays (not shown) of the second recovery circuit to indicate the digits dialed to reach trunk T2 as "235."

Assume that another call is originated at station S and that the digits "28" are dialed at said station, actuating selectors S1 and S2 to extend the line of said station to trunk T1. The selector brush of selector S2 now engaging the terminals of trunk T1 in said selector, the selector circuit and the trunk circuit operate in the usual manner. Said trunk being idle, battery in the trunk circuit through No. 1 normal contacts of relay TR1, conductor 61, upper winding of relay SR2, the sleeve terminal of selector S2, and the winding of a relay (not shown) in the sleeve circuit of the selector brush, to ground, operates said latter relay which grounds said sleeve terminal. Relay SR2 then operates over the circuit traced above through its upper winding and locks up through its lower winding and contacts to said ground. The battery in the trunk circuit referred to above, is then replaced by ground, and the ground in the selector circuit removed, making said trunk test busy so that no selector brush will rest upon the terminals of trunk T1 in selectors S1 and S3. Reference may be had to the patent to A. J. Busch No. 2,301,015 issued November 3, 1942, for a more complete description of the operation of the selector and trunk circuits. When relay TR1 is operated by any suitable means to recover the digits dialed at station S, the start relay ST1 of the trunk finder circuit also operates over a circuit extending from battery through the winding of said relay, conductor 60, and No. 2 contacts of relay TR1 to ground, causing one of the trunk finder switches, for example, switch F3, to connect the cathode of pulsing tube P3 to the sleeve conductor 61 of trunk T1. When tube P3 then conducts, supplying potential from its cathode to the anodes of tubes I13, I15, I17, etc., a positive pulse is also transmitted from the junction of resistances R15 and R16 through switch F3, conductor 61, outer contacts of relay SR2, conductor 52, and tubes N3, N4 and N5 to bus bars D2, A2 and B8. The positive pulse on bus bar D2 is ineffective as regards tubes I3 and I9 but effective in respect to tube I15, for the reasons stated above, actuating tubes I15 and I16 to operate RL3, in the manner described above for tubes I3 and I4 and relay RL1. Operation of relay RL3 indicates that two digits were dialed to reach trunk T1. The positive pulses on bus bars A2 and B8 actuate similar tubes and relays of the third recovery circuit in a similar manner to indicate that the digits dialed to reach trunk T1 were "28." If, however, there had been dialed at station S, the digit "9," actuating selector S1 to extend the line of said station to trunk T1, relay SR1 would be operated in a manner similar to that described above for relay SR2 and a pulse from one of the pulsing tubes P1, P2 and P3 would be transmitted through the outer contacts of said relay, conductor 51, and tubes N1 and N2 to bus bars D1 and A9. Tubes (not shown) similar to tubes I3 and I4 associated with bus bar D1 are thereby actuated to operate a relay (not shown) similar to relay RL1 to indicate that one digit was dialed to reach trunk T1 and similar tubes and relay (not shown) associated with bus bar A9 are actuated to indicate that the digit dialed was "9." It will be understood that the digits dialed at other stations not shown to reach trunks T1, T2, T3, and other trunks not shown will be similarly indicated and that the three recovery circuits shown and other recovery circuits not shown may be simultaneously connected for the recovery of digits dialed, the number of such recovery circuits being unlimited.

While I have illustrated my invention in its application to a particular telephone system, it is not limited to such application nor to the specific arrangements herein disclosed. It will be apparent to one skilled in the art that various applications, modifications, and arrangements other than those disclosed herein, are within the scope of the invention.

The terms and expressions which I have employed in reference to this invention and its elements are used as terms of description and not of limitation, and I have no intention in the use of such terms and expressions of excluding thereby equivalents of the features shown and described or portions thereof but, on the contrary, intend to include therein any and all equivalents and modifications which may be employed without departing from the spirit of the invention.

What is claimed is:

1. In a telephone switching system, a calling line, a trunk having a terminal appearance on the terminal banks of one or more switching selectors of different digital orders, one or more of said selectors being responsive to digital impulses from said calling line for extending said line to said trunk over one of said terminal appearances, and means including electronic devices effective upon the extension of said line to said trunk over said terminal appearance for indicating the number of digital impulses expended to extend said line to said trunk over said terminal appearance.

2. In a telephone switching system, a calling line, a trunk having a terminal appearance on the terminal banks of one or more switching selectors of different digital orders, one or more of said selectors being responsive to digital impulses from said calling line for extending said line to said trunk over one of said terminal appearances, and means including electronic devices effective upon the extension of said line to said trunk over said terminal appearance for indicating the value of each of the digits expended to extend said line to said trunk over said terminal appearance.

3. In a telephone switching system, a calling line, a trunk having a terminal appearance on the terminal banks of one or more switching selectors of different digital orders, one or more of said selectors being responsive to digital impulses from said calling line for extending said line to said trunk over one of said terminal appearances, and means including electronic devices effective upon the extension of said line to said trunk over one of said terminal appearances for indicating the number of digits expended to extend said line to said trunk over said terminal appearance and the value of each of said digits.

4. In a telephone switching system, the combination with calling lines, trunks, and switching selectors responsive to digital impulses from said lines to extend said lines to said trunks, of means for applying an impulse of momentary duration to one of said trunks when connected to one of said lines, and means including electronic devices responsive to said impulse for indicating the digital impulses employed to establish said connection.

5. In a telephone switching system, the combination with calling lines, trunks, and switching selectors responsive to digital impulses from said lines to extend said lines to said trunks, of electronic means for applying an impulse of momentary duration to one of said trunks when connected to one of said lines, and means including electronic devices responsive to said impulse for indicating the digital impulses employed to establish said connection.

6. In a telephone switching system, in combination with calling lines, trunks, and switching selectors responsive to digital impulses from said lines to extend said lines to said trunks, means for applying an impulse to one of said trunks when connected to one of said lines, means for directing said impulse selectively over a plurality of paths, and means responsive to said impulse on each of said paths for indicating the digital impulses employed to establish said connection.

7. In a telephone switching system, in combination with calling lines, trunks, and switching selectors responsive to digital impulses from said lines to extend said lines to said trunks, electronic means for applying an impulse to one of said trunks when connected to one of said lines, electronic means for directing said impulse over a plurality of paths, and means including electronic devices responsive to said impulse on each of said paths for indicating the digital impulses employed to establish said connection.

8. In a telephone switching system in which dial impulses are expended to extend calling lines to trunks, a digit recovery circuit comprising a group of conductors for each expended digit to be recovered, there being in each group of conductors one conductor for each possible value of said digit, means for applying an impulse to a trunk when connected to a calling line, means for directing said applied impulse selectively to that conductor in each group of conductors which represents the digital value of an expended digit, and means connected to each conductor in each group of conductors and responsive to the impulse applied to said conductor for indicating the value of said expended digit.

9. In a telephone switching system in which digital impulses are expended to extend calling lines to trunks, a digit recovery circuit comprising a group of conductors for each expended digit to be recovered, there being in each group of conductors one conductor for each possible value of said digit, electronic means for applying an impulse to a trunk when connected to a calling line, electronic means for directing said applied impulse selectively to that conductor in each group of conductors which represents the digital value of an expended digit, and means connected to each conductor in each group of conductors and responsive to the impulse applied to said conductor for indicating the value of said expended digit.

10. In a telephone switching system comprising in combination with calling lines, trunks, means responsive to digital impulses from said lines for extending said lines to said trunks, of a plurality of digit-recovery circuits each comprising means for producing a momentary impulse, indicating means responsive to said impulse, means for connecting one of said digit-recovery circuits to each of said trunks when the latter is connected to a calling line, and common impulsing means for actuating said impulse producing means in each of said digit-recovery circuits, thereby to operate each of said indicating means to indicate the digital impulses expended in connection each of said calling lines to a trunk.

11. In a telephone switching system comprising in combination with calling lines, trunks, means responsive to digital impulses from said lines for extending said lines to said trunks, of a plurality of digit-recovery circuits each comprising electronic means for producing a momentary impulse and electronic indicating means responsive to said impulse, means for connecting one of said digit-recovery circuits to each of said trunks when the latter is connected to a calling line, and common impulsing means for actuating said impulse producing means in each of said digit-recovery circuits, thereby to operate each of said electronic indicating means to indicate the digital impulses expended in connecting each of said calling lines to a trunk.

12. In a telephone switching system comprising in combination with calling lines, trunks, means responsive to digital impulses from said lines for extending said lines to said trunks, of a plurality of digit-recovery circuits each comprising electronic means for producing a momentary impulse and electronic indicating means responsive to said impulse, means for connecting one of said digit-recovery circuits to each of said trunks when the latter is connected to a calling line, and common electronic means for actuating said impulse producing means in each of said digit-recovery circuits, thereby to operate each of said electronic indicating means to indicate the digital impulses expended in connecting each of said calling lines to a trunk.

13. A telephone system comprising in combination calling lines, trunks, switching selectors responsive to digital impulses from said calling lines to establish connections to said trunks, and means including electronic devices rendered operative upon the connection of one of said calling lines to one of said trunks for indicating the digital values of the impulses employed to establish said connection.

14. A telephone system comprising in combination calling lines, trunks, switching selectors responsive to digital impulses from said calling lines to establish connections to said trunks, and means including electronic devices rendered operative upon the connection of one of said calling lines to one of said trunks for indicating the number of digital impulses employed to establish said connection.

15. A telephone system comprising in combination calling lines, trunks, switching selectors responsive to digital impulses from said calling lines to establish connections to said trunks, and means including electronic devices rendered operative upon the connection of one of said calling lines to one of said trunks for indicating the number of digital impulses employed to establish said connection and the digital value of each of said impulses.

WILLIAM H. T. HOLDEN.

REFERENCES CITED

The following references are of record in the file of this patent:

UNITED STATES PATENTS

| Number | Name | Date |
|---|---|---|
| 1,387,280 | Lundell | Aug. 9, 1921 |
| 1,388,887 | Polinkowsky | Aug. 30, 1921 |
| 1,650,763 | Mackenzie | Nov. 29, 1927 |
| 1,729,857 | Stehlik | Oct. 1, 1929 |
| 2,238,223 | Kozma | Apr. 15, 1941 |
| 2,267,950 | Rhodes | Dec. 30, 1941 |
| 2,300,829 | Gooderham | Nov. 3, 1942 |
| 2,301,015 | Busch | Nov. 3, 1942 |
| 2,306,729 | Holden | Dec. 29, 1942 |
| 2,351,551 | Seibel | June 13, 1942 |
| 2,495,769 | Reeves | Jan. 31, 1950 |

FOREIGN PATENTS

| Number | Country | Date |
|---|---|---|
| 609,477 | Great Britain | Oct. 1, 1948 |